United States Patent
Myeong et al.

(10) Patent No.: US 10,997,744 B2
(45) Date of Patent: May 4, 2021

(54) LOCALIZATION METHOD AND SYSTEM FOR AUGMENTED REALITY IN MOBILE DEVICES

(71) Applicant: Korea Advanced Institute of Science and Technology, Daejeon (KR)

(72) Inventors: Hyeon Myeong, Daejeon (KR); Kwang Yik Jung, Daejeon (KR); Pillip Youn, Daejeon (KR); Yeeun Kim, Daejeon (KR); HyunJun Lim, Daejeon (KR); Seungwon Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 58 days.

(21) Appl. No.: 16/374,106

(22) Filed: Apr. 3, 2019

(65) Prior Publication Data
US 2019/0304128 A1 Oct. 3, 2019

(30) Foreign Application Priority Data

Apr. 3, 2018 (KR) .................. 10-2018-0038605
Oct. 26, 2018 (KR) .................. 10-2018-0128595

(51) Int. Cl.
*G06T 7/73* (2017.01)
*G06T 7/00* (2017.01)

(52) U.S. Cl.
CPC .................. *G06T 7/73* (2017.01); *G06T 7/97* (2017.01); *G06T 2207/10004* (2013.01)

(58) Field of Classification Search
CPC . G06T 2207/10004; G06T 2207/30244; G06T 7/246; G06T 7/73; G06T 7/97
See application file for complete search history.

(56) References Cited

U.S. PATENT DOCUMENTS

| 9,406,137 B2* | 8/2016 | Ahuja ................ G06T 7/246 |
| 10,380,753 B1* | 8/2019 | Csordas .............. G06N 3/063 |
| 2010/0172571 A1* | 7/2010 | Yoon ................ G06T 7/248 382/153 |
| 2012/0300020 A1* | 11/2012 | Arth ................ G06T 7/75 348/36 |
| 2014/0055632 A1 | 2/2014 | Lelescu et al. |

(Continued)

FOREIGN PATENT DOCUMENTS

WO 2014116545 A1 7/2014

OTHER PUBLICATIONS

Korean Office Action dated Feb. 10, 2020 by the Korean Patent Office in corresponding Korean Patent Application No. 10-2018-0128595, filed Oct. 26, 2018, 5 pages.

*Primary Examiner* — Bobbak Safaipour
(74) *Attorney, Agent, or Firm* — Christensen O'Connor Johnson Kindness PLLC (57) ABSTRACT

The present invention relates to localization method and system for providing augmented reality in mobile devices and includes sub-sampling image data acquired from a camera in the mobile devices, and extracting image patch including line and point in low-resolution image data, matching feature pairs of point features between the image patch and previous image patch according to movement of the camera, and producing line of subpixel for the image patch, and estimating a location of the camera in the mobile devices based on difference between the produced line and estimated line by inertia.

16 Claims, 6 Drawing Sheets

(56) References Cited

U.S. PATENT DOCUMENTS

| | | | |
|---|---|---|---|
| 2014/0369557 A1* | 12/2014 | Kayombya | G06T 7/73 |
| | | | 382/103 |
| 2015/0371440 A1* | 12/2015 | Pirchheim | G06T 7/73 |
| | | | 345/419 |
| 2018/0189576 A1* | 7/2018 | Joshi | G06K 9/00798 |
| 2018/0315163 A1* | 11/2018 | Livyatan | G06T 7/579 |
| 2019/0095745 A1* | 3/2019 | Bao | G06K 9/4604 |
| 2020/0226825 A1* | 7/2020 | Bian | G06T 7/55 |
| 2020/0258204 A1* | 8/2020 | Fang | G06T 3/0012 |
| 2020/0372672 A1* | 11/2020 | Schonberger | G06K 9/00791 |

\* cited by examiner

LOCALIZATION METHOD AND SYSTEM FOR AUGMENTED REALITY IN MOBILE DEVICES

CROSS-REFERENCES TO RELATED APPLICATIONS

This application claims the priority benefit of Korean Patent Application No. 10-2018-0038605, filed on Apr. 3, 2018 and Korean Patent Application No. 10-2018-0128595, filed on Oct. 26, 2018, in the Korean Intellectual Property Office, the disclosures of which are incorporated herein by reference.

BACKGROUND

1. Field of the Invention

The present disclosure relates to localization method and system for augmented reality in mobile devices, more particularly, a technology for estimating a location of a camera in mobile devices by extracting only valid information of low-resolution image data.

2. Description of Related Art

As hi-end mobile devices are supplied and network is developed, smartphones evolve into mobile content consumption channels and mobile content market grows rapidly. Particularly, LBS (Location Based Service) is regarded as killer content.

Existing recognition algorithms for mobile platform perform positioning in order of GPS satellite signal, Wi-Fi AP, base station ID, but it cannot perform indoor positioning because of absence of integrated database. Also, as high-end mobile devices are supplied, localization researches based on image recognition technology by using cameras and accelerometers are actively conducted, but low-cost marker based localization is the most up till now.

Furthermore, existing localization algorithms based on image using a single camera in a device have a limit that scale information cannot be known unless marker or object whose size is known in advance is used.

Also, the existing localization algorithms have problems that it may not perform accurate algorithm operations in hallway or large space or in an image consist of homogeneous material/texture in which it is hard to extract features, and uncertainty is increased due to expressing feature data by accessing straight feature data with a modeling method.

In other words, the existing camera image based localization algorithms have a limit of accuracy and computation and a limit of feature/line based algorithms.

SUMMARY

Purpose of the present disclosure is to minimize computation of mobile devices by using image patch of low-resolution image data in a process of extracting features of an image and point matching features.

Also, purpose of the present disclosure is to minimize errors in extracting line comparison target by double matching by using camera movement based on an IMU (Inertial Measurement Unit) and point features in order to match feature pairs in image patch.

Also, purpose of the present disclosure is to guarantee high accuracy having small computation by extracting subpixel line having high accuracy and comparing features on each image patch.

According to at least one example of embodiments, an operation method of a localization system for providing augmented reality in mobile devices, a localization method for augmented reality includes sub-sampling image data acquired from a camera in the mobile devices, and extracting image patch including line and point in low-resolution image data, matching feature pairs of point features between the image patch and previous image patch according to movement of the camera, and producing line of subpixel for the image patch, and estimating a location of the camera in the mobile devices based on difference between the produced line and estimated line by inertia.

The extracting image patch may include receiving high-resolution image data from the camera in the mobile devices, acquiring the low-resolution image data by sub-sampling the high-resolution image data, extracting features of line and point from the low-resolution image data, and extracting the image patch including the features of line and of point.

The extracting the image patch including the features of line and point may extract the circular image patch including all of line features and point features from the low-resolution image data.

The matching feature pairs and producing line of subpixel for the image patch may include confirming whether it is matched or not for feature pairs by using an IMU (Inertial Measurement Unit) and point features in the image patch, and extracting the line of subpixel for the image patch by 3D line distribution.

The confirming whether it is matched or not for feature pairs may search point features of image patch (t) according to the movement of the camera [R/t] detected from the IMU on the basis of previous image patch (t−1), and acquire a plurality of feature pairs having the same straight line segment by matching each of the point features of the previous image patch (t−1) and the point features of the image patch (t).

The extracting the line of subpixel for the image patch may expand 3D distribution for the image patch (t) by using the 3D line distribution of 3D Gaussian kernel, produce maximum line connecting maximum point in 3D distribution result, and acquire the accurate subpixel line.

The estimating a location of the camera in the mobile devices may estimate the location of the camera by producing innovation term between the estimated line for the previous image patch (t−1) acquired by using an Inertial Navigation Sensor included in the mobile devices and the produced line for the image patch (t).

The estimating the location of the camera in the mobile devices may improve accuracy of the estimate of the location of the camera (state x) by considering gradient difference between line gradient (at) of the produced line in the image patch (t) and line gradient (at−1) of the estimated line in the previous image patch (t−1).

According to at least one example of embodiments, a localization system for providing augmented reality in mobile devices, a localization system for augmented reality includes an image patch extracting unit for sub-sampling image data acquired from a camera in the mobile devices, and extracting image patch including line and point from low-resolution image data, a producing unit for matching feature pairs of point features between the image patch and previous image patch according to movement of the camera, and producing line of subpixel for the image patch, and an estimating unit for estimating a location of the camera in the mobile devices based on difference between the produced line and estimated line by inertia.

The image patch extracting unit may include an image data receiving unit for receiving high-resolution image data from the camera in the mobile devices, a low-resolution image data acquiring unit for acquiring the low-resolution image data including line and point by sub-sampling the high-resolution image data, and a feature extracting unit for extracting the image patch including features of line and point from the low-resolution image data.

The feature extracting unit may extract the circular image patch including line features and point features from the low-resolution image data.

The producing unit may include a matching confirming unit for confirming whether it is matched or not for feature pairs by using an IMU (Inertial Measurement Unit) and point features in the image patch, and a line extracting unit for extracting the line of subpixel for the image patch by 3D line distribution.

The matching confirming unit may search point features of image patch (t) according to the movement of the camera [R/t] detected from the IMU in the basis of previous image patch (t−1), and acquire a plurality of feature pairs having the same straight line segment by matching each of the point features of the previous image patch (t−1) and the point features of the image patch (t).

The line extracting unit may expand 3D distribution for the image patch (t) by using the 3D line distribution of 3D Gaussian kernel, produce maximum line connecting maximum point in 3D distribution result, and extract the accurate subpixel.

The location estimating unit may estimate the location of the camera by producing innovation term between the estimated line for the previous image patch (t−1) acquired by using an Inertial Navigation Sensor included in the mobile devices and the produced line for the image patch (t).

The location estimating unit may improve accuracy of the estimate of the location of the camera (state x) by considering gradient difference between line gradient (at) of the produced line in the image patch (t) and line gradient (at−1) of the estimated line in the previous image patch (t−1).

According to example embodiments, computation of mobile devices may be minimized by using image patch of low-resolution image data in a process of extracting features of an image and point matching features.

Also, according to example embodiments, errors in extracting line comparison target may be minimized by double matching by using camera movement based on an IMU (Inertial Measurement Unit) and point features in order to matching feature pairs in image patch.

Also, according to example embodiments, high accuracy with small computation may be guaranteed by extracting subpixel line having high accuracy and comparing features of each image patch.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Also, terminologies used herein refer to terms used to appropriately represent the example embodiments and may vary based on a reader, the intent of an operator, or custom of a field to which this disclosure belongs, and the like. Accordingly, the definition of the terms should be made based on the overall description of the present specification.

There are problems that in case that an image matching based localization technology performs feature matching between high-resolution image data, matching performance is guaranteed, but computation is increased, and in case of performing matching after sub-sampling high-resolution image data into low-resolution image data, performance is not guaranteed.

Accordingly, localization method and system for augmented reality in mobile devices according to an example of embodiments changes high-resolution image data to low-resolution image data and uses it by considering computation limit of mobile devices, and applies 'image patch method' extracting only valid information of low-resolution image data and using it.

The image patch method mainly uses Normalized Cross Correlation and Euclidean Distance of image descriptor.

The Normalized Cross Correlation has disadvantages that it may not be applied when size of image patch is different, and computation is increased because size of image patch is diversified by resizing image data, and then compared.

The method using image descriptor equally calculates gradient in all pixel in image patch, and have a process generating descriptor. At this point, if pixel surround gradient information is not useful, accurate image matching is impossible.

To overcome above described problems and limits, localization method and system for augmented reality in mobile devices according to an example of embodiments use low-resolution image patch, match feature pairs by using an Inertial Navigation Sensor and point features, produce line of subpixel unit by 3D line distribution, and perform accurate location estimation with calculation of innovation term between lines.

Hereinafter, the present disclosure is described in detail referring to FIGS. 1 to 6.

Figure 1:
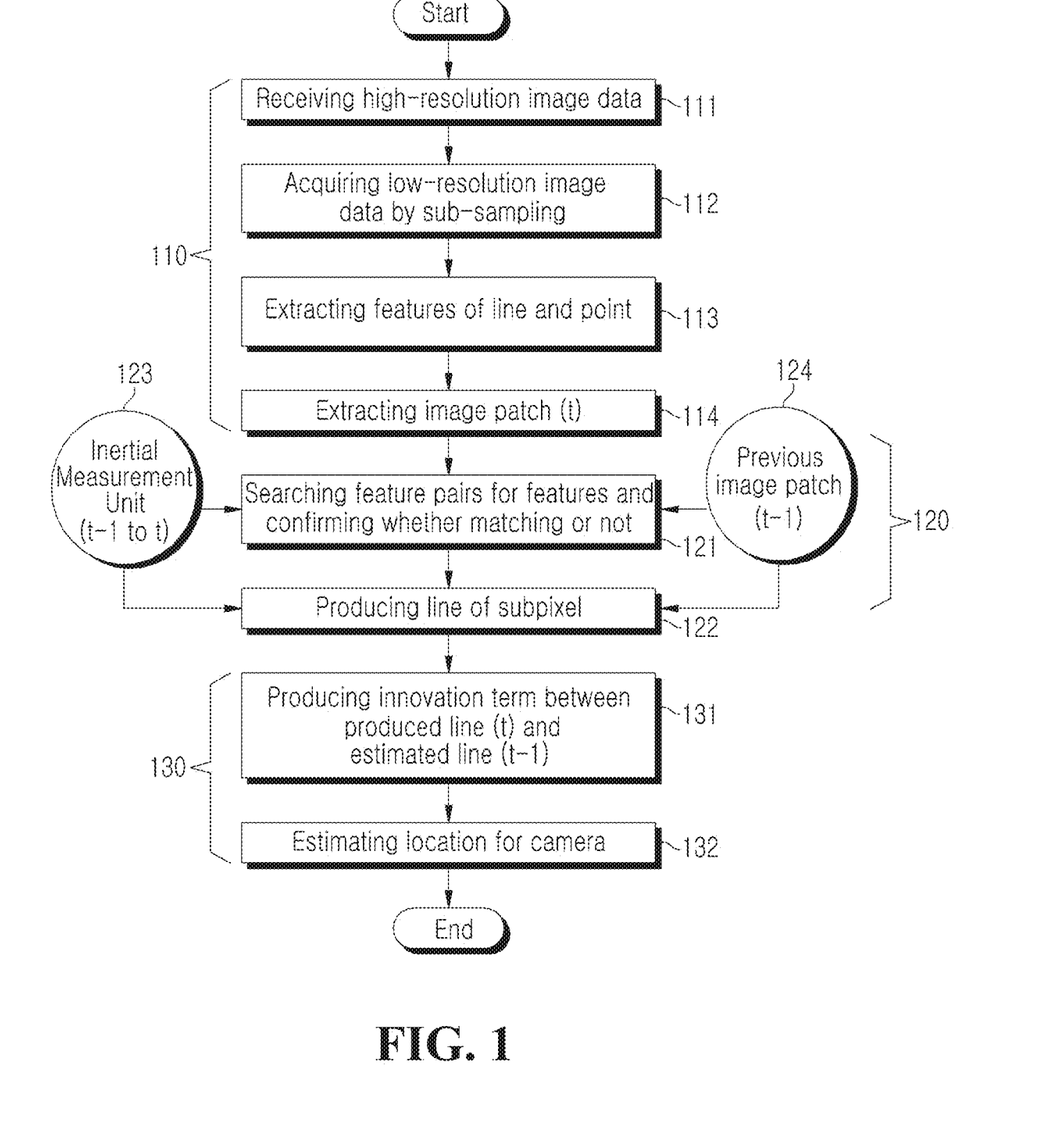
FIG. 1 is a flow chart illustrating a localization method for augmented reality according to an example of embodiments.

FIG. 1 is a flow chart illustrating a localization method for augmented reality according to an example of embodiments.

Figure 6:
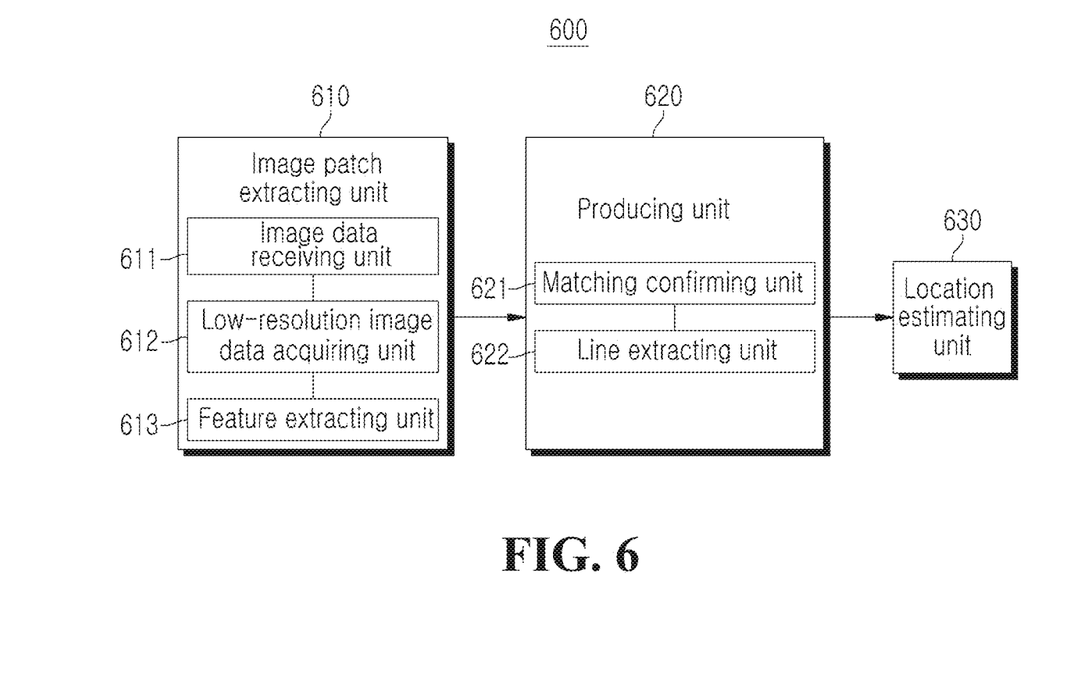
FIG. 6 is a block diagram illustrating detailed configuration of a localization system for providing augmented reality in mobile devices according to an example of embodiments.

A method of FIG. 1 is performed by a localization system for augmented reality in mobile devices according to an example of embodiments illustrated in FIG. 6.

Referring to FIG. 1, in Step 110, image data acquired from a camera in mobile devices is sub-sampled, and image patch including line and point is extracted from low-resolution image data.

In Step 111, high-resolution image data may be received from a camera in mobile devices.

For example, mobile devices may take and acquire high-resolution image data by using HD Video. At this point, the mobile devices may be at least one of a laptop computer, a smart phone, a tablet PC, and a wearable computer possessed by a user, and portable devices including HD camera taking surrounding environment.

In Step 112, low-resolution image data may be acquired by sub-sampling high-resolution image data.

In Step 113, features of line and point may be extracted from low-resolution image data. Also, in Step 114, image patch (t) including features of line and point may be extracted.

For example, Step 113 may extract features in a form of point from low-resolution image data, and extract features in a form of line connecting a plurality of points. Accordingly, Step 114 may extract circular image patch including all of line features and point features from low-resolution image data.

It is natural that the features of line and point are flexibly changed from low-resolution image data acquired in accordance with movement of a camera. Also, the form of image patch is not limited to the circular form.

In Step 120, according to movement of the camera, feature pairs of point features between image patch (t) and previous image patch (t−1) 124 are matched, and line of subpixel for image patch is produced.

In Step 121, based on an IMU (Inertial Measurement Unit) 123, it may be confirmed whether it is matched or not by searching feature pairs for point features in image patch.

Point features in image patch (t) may be changed by movement of the camera. Accordingly, localization method and system for augmented reality in mobile devices according to an example of embodiments may detect detailed change of features by using the IMU 123 measuring speed, direction, gravity, and acceleration of mobile devices.

Step 121 features to match feature pairs by using the IMU 123 and point features. For example, when movement of the camera occurs, because point features in image patch (t) are changed, Step 121 may acquire plurality of feature pairs having the same straight line segment by matching each of point features in image patch (t) according to movement of the camera [R/t] acquired from the IMU 123 and point features on the previous image patch (t−1) 124.

In Step 122, line of subpixel for image patch may be extracted by 3D line distribution.

More particularly, Step 122 may expand 3D distribution for image patch (t) by using 3D line distribution of 3D Gaussian kernel, and acquire accurate subpixel line by producing maximum line connecting maximum point in 3D distribution result.

For example, Step 122 may make a graph for line features of image patch (t), and expand graphed line features in 3D distribution by using 3D line distribution of 3D Gaussian kernel. Then, Step 122 may extract line having improved subpixel accuracy by producing maximum line connecting maximum point acquired from 3D distribution result.

In Step 130, location of the camera in mobile devices is estimated based on difference between the produced line and estimated line by inertia.

In Step 131, location of the camera may be estimated by producing innovation term between the estimated line for previous image patch (t−1) acquired by using an Inertial Navigation Sensor (or IMU) and the estimated line for image patch (t). At this point, the estimated line may refer to line having improved subpixel accuracy acquired in Step 122.

Step 132 may improve accuracy of the estimate of camera location (state x) in mobile devices through the below [Equation 1].

For example, Step 132 may improve accuracy of the estimate of camera location (state x) by considering gradient difference between line gradient (at) of produced line from image patch (t) estimated through the processing of producing innovation term of Step 131 and line gradient (at−1) of estimated line from the previous image patch (t−1).

$$\tilde{y}_k = z_k - H_k \hat{x}_k|_{k-1}$$ [Equation 1]

Here, $\hat{x}_k|_{k-1}$ indicates a priori predicted state by predicting state between 'k−1' point and 'k' point, and $z_k$ indicates observation value at k time. Also, $H_k$ indicates observation model, and $\tilde{y}_k$ indicates a difference value comparing priori predicted state value and real observation value at 'k' point.

Figure 2:
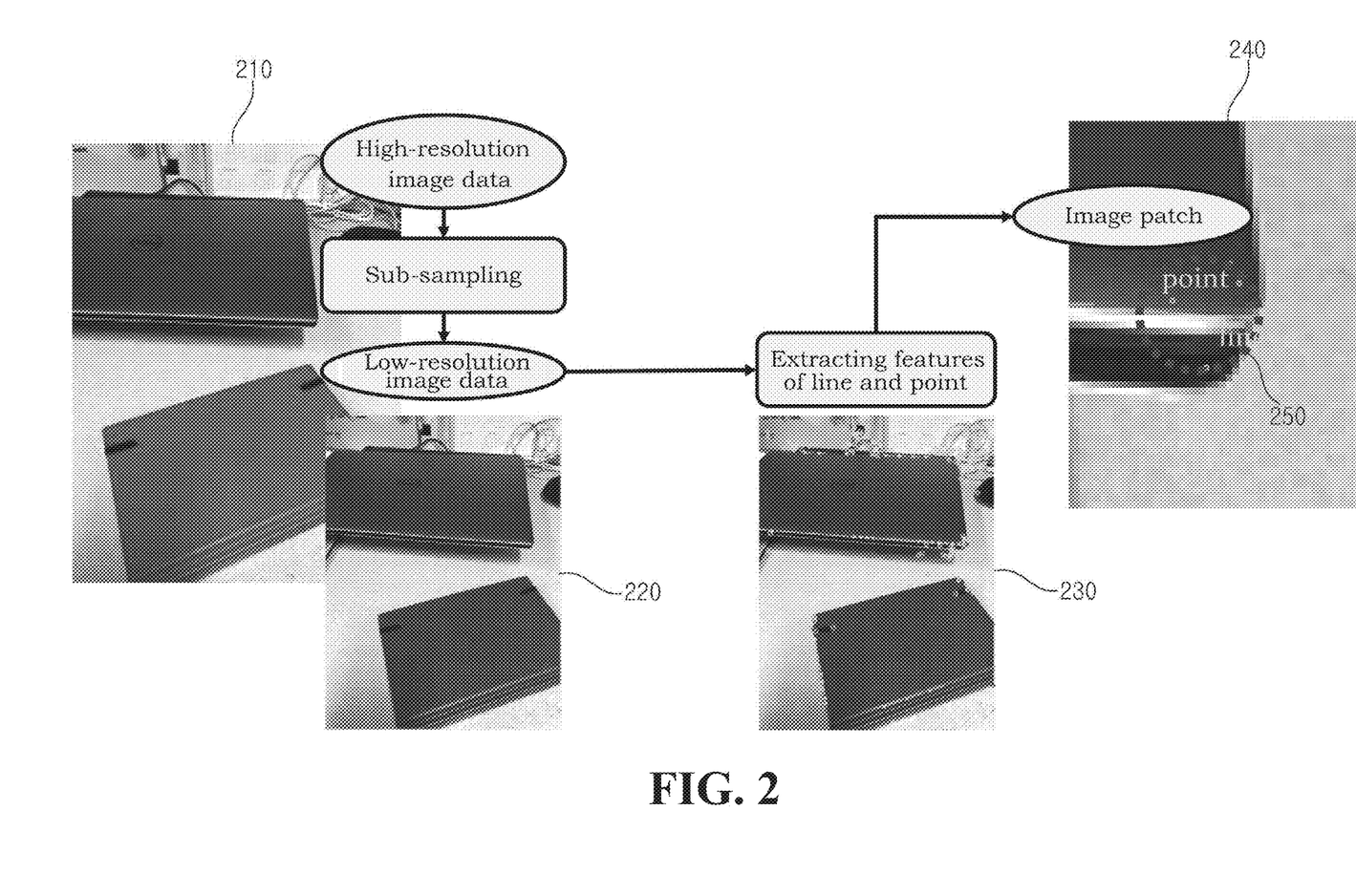
FIG. 2 illustrates an example of performing sub-sampling and extracting image patch according to an example of embodiments.

FIG. 2 illustrates an example of performing sub-sampling and extracting image patch according to an example of embodiments.

Referring to FIG. 2, localization method and system for augmented reality in mobile devices according to an example of embodiments may acquire low-resolution image data 220 by sub-sampling high-resolution image data 210 acquired from a camera in mobile devices.

Then, localization method and system for augmented reality in mobile devices according to an example of embodiments may extract 230 features of line and point from the low-resolution image data 220, and acquire image patch 250 extracting features including all features of each of line and point.

Here, the image patch 250 may be circular image patch, and a form of low-resolution image data 240 including image patch by considering computation.

Figure 3:
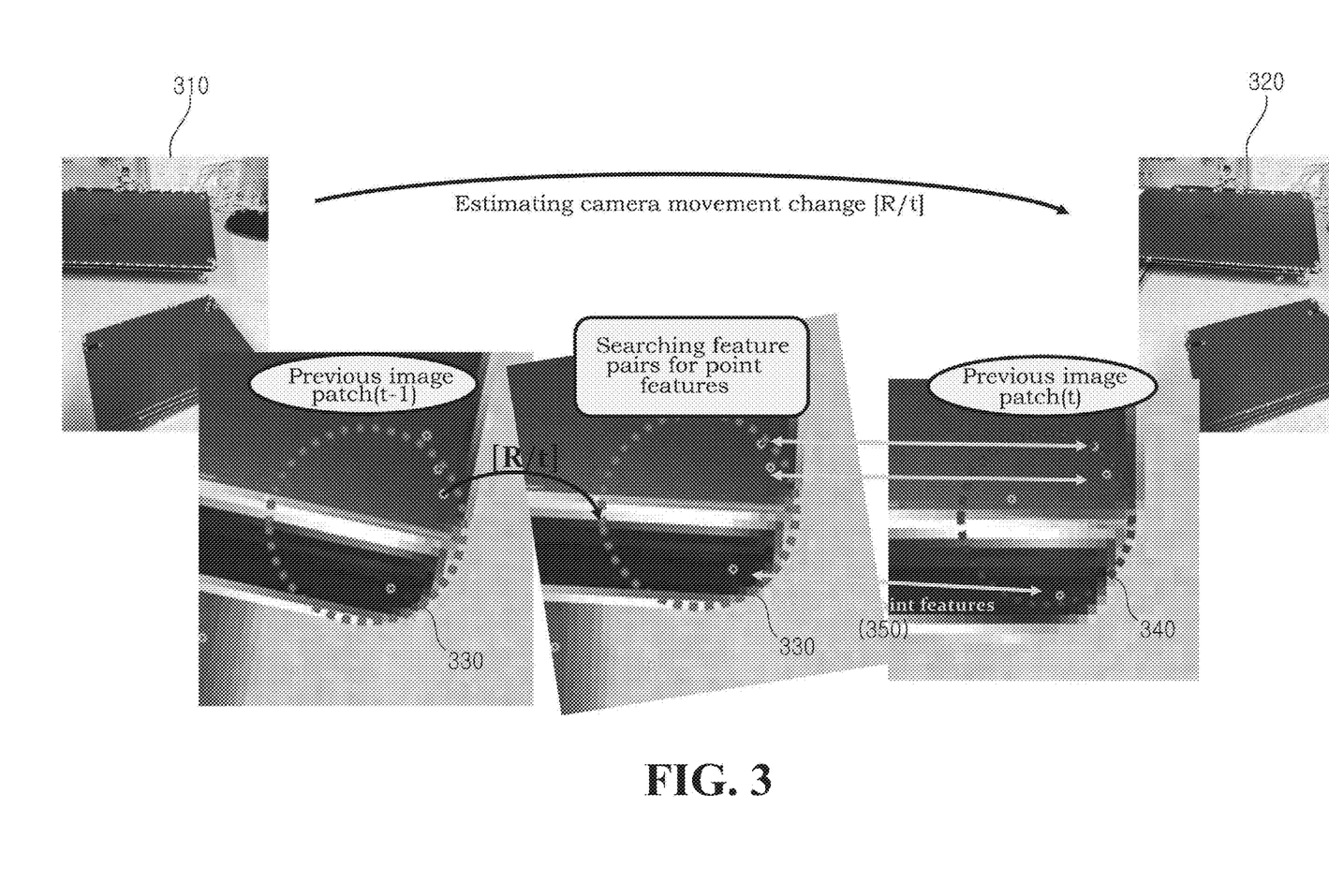
FIG. 3 illustrates an example of matching feature pairs of features according to an example of embodiments.

FIG. 3 illustrates an example of matching feature pairs of features according to an example of embodiments.

Localization method and system for augmented reality in mobile devices according to an example of embodiments may estimate change of movement of a camera [R/t], and match feature pairs of point features between image patch (t) and previous image patch (t−1).

Referring to FIG. 3, change of point features between low-resolution image data 310 including previous image patch (t−1) and low-resolution image data 320 including image patch (t) occurs in accordance with movement of the camera [R/t].

To minimize change by the movement, localization method and system for augmented reality in mobile devices according to an example of embodiments may acquire feature pairs 350 by respectively matching point features included in previous image patch (t−1) 330 and point features included in image patch (t) 340.

Localization method and system for augmented reality in mobile devices according to an example of embodiments features to match the feature pairs 350 by using an IMU and point features.

For example, Localization method and system for augmented reality in mobile devices according to an example of embodiments may distinct features to be matched with present image patch 340 with estimated location considering camera movement [R/t] on the basis of location of the previous image patch 330. Then, localization method and system for augmented reality in mobile devices according to an example of embodiments may extract matching of previous image patch (red circle) 330 and present image patch (blue circle) 340 by matching matchable features, for example, feature pairs 350 between point features among point features and line features.

Figure 4:
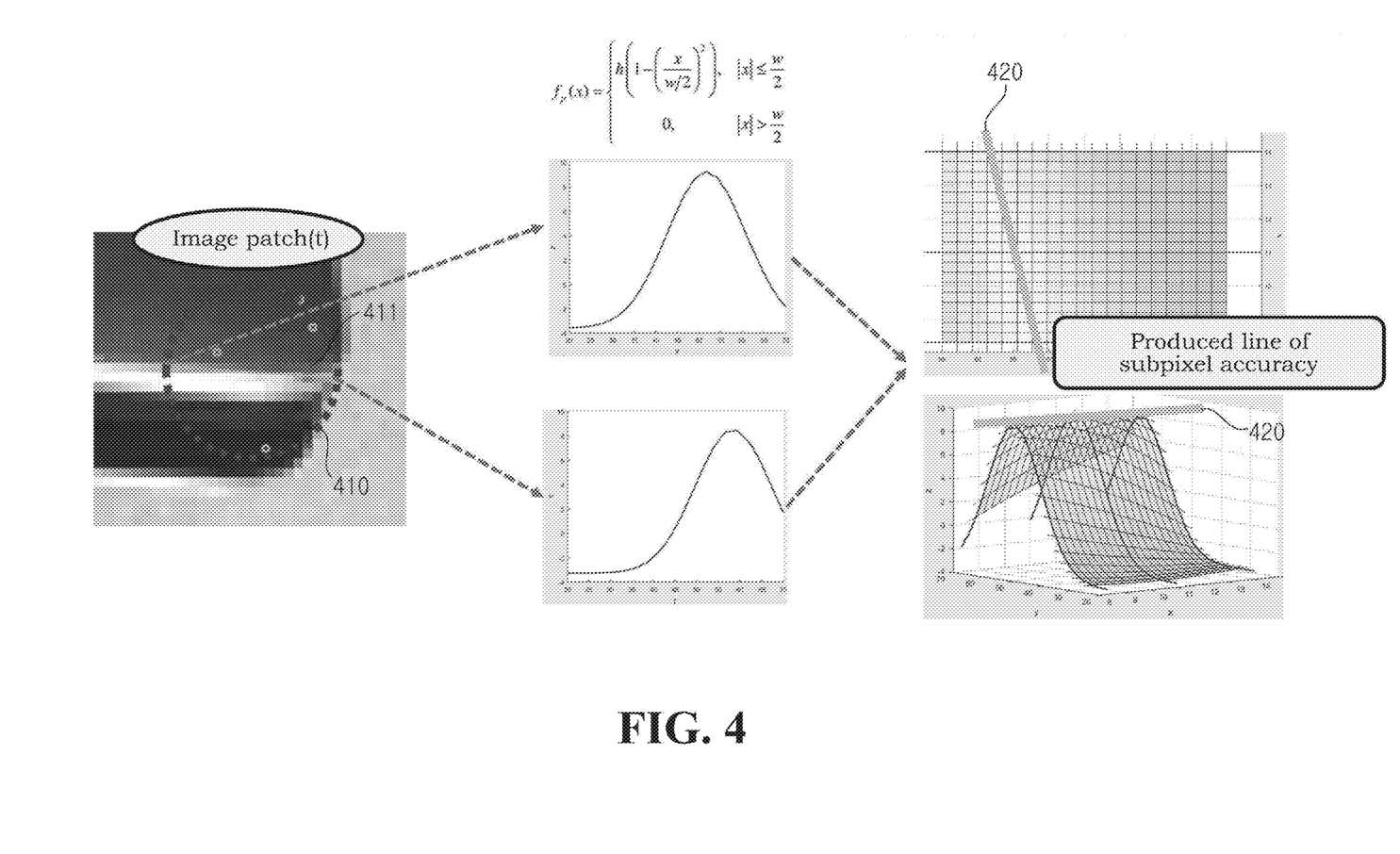
FIG. 4 illustrates an example of extracting line of subpixel according to an example of embodiments.

FIG. 4 illustrates an example of extracting line of subpixel according to an example of embodiments.

Referring to FIG. 4, localization method and system for augmented reality in mobile devices according to an example of embodiments may be included in image patch (t) 410, and improve accuracy of subpixel for unapparent line features 411 by low-resolution image data.

For example, localization method and system for augmented reality in mobile devices according to an example of embodiments may make a graph for line features 411 for the image patch (t) 410, and expand the graphed line features 411 with 3D distribution by using 3D line distribution of 3D Gaussian kernel.

Afterward, localization method and system for augmented reality in mobile devices according to an example of embodiments may extract line 420 having improved accuracy of subpixel by producing maximum line connecting maximum point acquired from 3D distribution result.

Figure 5:
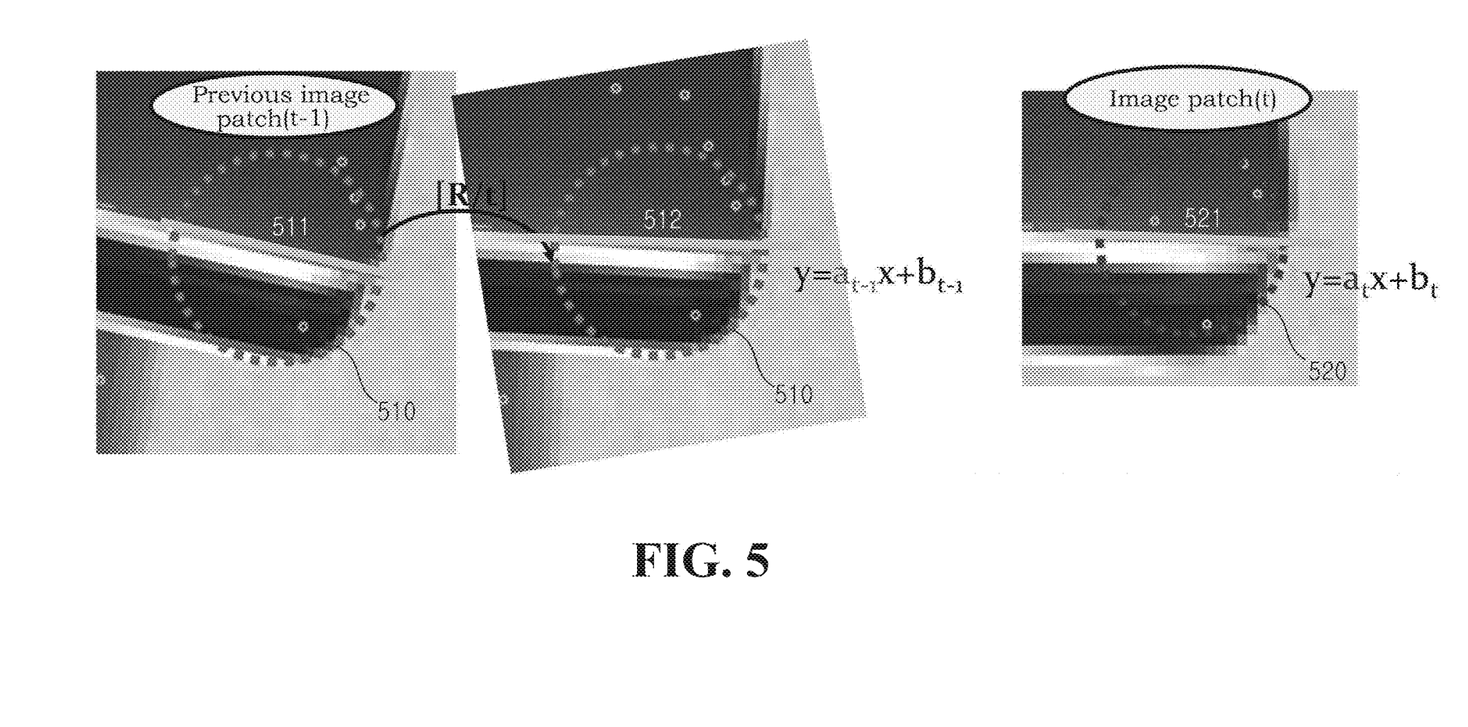
FIG. 5 illustrates an example of location estimation according to an example of embodiments.

FIG. 5 illustrates an example of location estimation according to an example of embodiments.

Referring to FIG. 5, Localization method and system for augmented reality in mobile devices according to an example of embodiments may estimate exact location by producing innovation term between estimated lines 511, 512 acquired by camera movement based on an Inertial Navigation Sensor (or IMU) in previous image patch (t−1) 510 and estimated line in present image patch (t) 520.

More particularly, localization method and system for augmented reality in mobile devices according to an example of embodiments may improve accuracy of estimate of camera location (state x) by considering gradient difference (|at−at−1|) between line gradient (at) of produced line 521 in the present image patch (t) 520 and line gradient (at−1) of estimated lines 511, 512 in the previous image patch (t−1) 510.

Here, the produced line 521 may be the above described line 420 having improved accuracy of subpixel in FIG. 4. Also, green line (located under yellow line) illustrated in FIG. 5 indicates unapparent line features in low-resolution image data, and yellow line (located above green line) indicates line having improved accuracy of subpixel.

FIG. 6 is a block diagram illustrating detailed configuration of localization system for providing augmented reality in mobile devices according to an example of embodiments.

Referring to FIG. 6, a localization system for augmented reality in mobile devices according to an example of embodiments extracts only valid information of low-resolution image data and estimates location of a camera in mobile devices.

For this, a localization system for augmented reality in mobile devices according to an example of embodiments 600 includes an image patch extracting unit 610, a producing unit 620, and a location estimating unit 630.

The image patch extracting unit 610 performs sub-sampling image data acquired from a camera in mobile devices, and extracts image patch including line and point from low-resolution image data.

The image patch extracting unit 610 may include an image data receiving unit 611, a low-resolution image data acquiring unit 612, and a feature extracting unit 613.

The image data receiving unit 611 may receive high-resolution image data from a camera in mobile devices.

For example, mobile devices may take and acquire high-resolution image data by using HD Video. Here, the mobile devices may be at least one of a laptop computer, a smart phone, a tablet PC, and a wearable computer possessed by a user, and may be portable devices including HD Video taking surrounding environment.

The low-resolution image data acquiring unit 612 may acquire low-resolution image data including line and point by sub-sampling high-resolution image data.

The feature extracting unit 613 may extract image patch including features of line and point from low-resolution image data.

For example, the feature extracting unit 613 may extract features in a form of point, and extract features in a form of line connecting a plurality of points. Afterward, the feature extracting unit 613 may extract circular image patch including all of features of line and features of point from low-resolution image data.

It is natural that the features of line and point are flexibly changed according to movement of a camera. Also, the form of image patch is not limited to circle.

The producing unit 620 may match feature pairs of point features of image patch (t) and previous image patch (t−1), and produce line of subpixel for image patch.

The producing unit 620 may include a matching confirming unit 612 and a line extracting unit 622.

The matching confirming unit 612 may confirm whether it is matched or not for feature pairs by using an IMU (Inertial Measurement Unit) and point features in image patch.

Point features in image patch (t) may be changed according to movement of a camera. Due to this, the localization for augmented reality in mobile devices according to an example of embodiments 600 may detect detailed change of features by using the IMU measuring speed, direction, gravity, and acceleration of mobile devices.

The matching confirming unit 612 features to match feature pairs by using an IMU and point features. For example, when movement of a camera occurs, because change of point features located in image patch (t) occurs, the matching confirming unit 612 may searched point features of image patch (t) according to movement of a camera [R/t] detected from an IMU on the basis of previous image patch (t−1), and acquire a plurality of feature pairs having the same straight line segment by matching each of point features of previous image patch (t−1) and point features of image patch (t).

The line extracting unit 622 may extract line of subpixel for image patch by 3D line distribution.

More particularly, the line extracting unit 622 may expand 3D distribution for image patch (t) by using 3D line distribution of 3D Gaussian kernel, and produce accurate subpixel line by producing maximum line connecting maximum point in 3D distribution result.

For example, the line extracting unit 622 may make a graph for line features of image patch (t), and expand the graphed line features with 3D distribution by using 3D line distribution of 3D Gaussian kernel. Afterward, the line extracting unit 622 may extract line having improved subpixel accuracy by producing maximum line connecting maximum point acquired from 3D distribution result.

The location estimating unit 630 estimates location of a camera in mobile devices based on difference between produced line and estimated line by inertia.

The location estimating unit 630 may estimate location of a camera by producing innovation term between estimated line for previous image patch (t−1) acquired by using an Inertial Navigation Sensor included in mobile devices and produced line for image patch (t). Here, the produced line may be referred to line having improved subpixel accuracy acquired by the line extracting unit 622.

The location estimating unit 630 may improve accuracy of estimate of camera location (state x) by considering gradient difference between line gradient (at) of produced line in image patch (t) estimated through the process for producing innovation term and line gradient (at−1) for estimated line in previous image patch (t−1).

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. An operation method of a localization system for providing augmented reality in mobile devices, a localization method for augmented reality comprising:
   sub-sampling first image data acquired from a camera in a mobile device, and extracting an image patch including line and point in the sub-sampled image data;
   matching feature pairs of point features between the image patch and a previous image patch according to movement of the camera, and producing a line of subpixel for the image patch; and
   estimating a location of the camera in the mobile devices based on difference between the produced line and estimated line by inertia.

2. The localization method of claim 1, wherein the extracting image patch comprises:
   receiving the first image data from the camera in the mobile device;
   acquiring the sub-sampled image data by sub-sampling the first image data;
   extracting features of line and point from the sub-sampled image data; and
   extracting the image patch including the features of line and of point.

3. The localization method of claim 2, wherein the extracting the image patch including the features of line and point extracts a circular image patch including all of line features and point features from the sub-sampled image data.

4. The localization method of claim 1, wherein the matching feature pairs and producing line of subpixel for the image patch comprise:
   confirming whether it is matched or not for feature pairs by using an IMU (Inertial Measurement Unit) and point features in the image patch; and
   extracting the line of subpixel for the image patch by 3D line distribution.

5. The localization method of claim 4, wherein the confirming whether it is matched or not for feature pairs searches point features of image patch (t) according to the movement of the camera [R/t] detected from the IMU on the basis of previous image patch (t−1), and acquires a plurality of feature pairs having the same straight line segment by matching each of the point features of the previous image patch (t−1) and the point features of the image patch (t).

6. The localization method of claim 5, wherein the extracting the line of subpixel for the image patch expands 3D distribution for the image patch (t) by using the 3D line distribution of 3D Gaussian kernel, produces maximum line connecting maximum point in 3D distribution result, and acquires the accurate subpixel line.

7. The localization method of claim 1, wherein the estimating a location of the camera in the mobile devices estimates the location of the camera by producing innovation term between the estimated line for the previous image patch (t−1) acquired by using an Inertial Navigation Sensor included in the mobile devices and the produced line for the image patch (t).

8. The localization method of claim 7, wherein the estimating the location of the camera in the mobile devices improves accuracy of the estimate of the location of the camera (state x) by considering gradient difference between line gradient (at) of the produced line in the image patch (t) and line gradient (at−1) of the estimated line in the previous image patch (t−1).

9. A localization system for providing augmented reality in mobile devices, a localization system for augmented reality comprising:
- an image patch extracting unit for sub-sampling first image data acquired from a camera in a mobile device, and extracting an image patch including line and point from the sub-sampled image data;
- a producing unit for matching feature pairs of point features between the image patch and a previous image patch according to movement of the camera, and producing a line of subpixel for the image patch; and
- an estimating unit for estimating a location of the camera in the mobile devices based on difference between the produced line and estimated line by inertia.

10. The localization system of claim 9, wherein the image patch extracting unit comprises:
- an image data receiving unit for receiving the first image data acquired from the camera in the mobile device;
- a sub-sampled image data acquiring unit for acquiring the sub-sampled image data including line and point by sub-sampling the first image data; and
- a feature extracting unit for extracting the image patch including features of line and point from the sub-sampled image data.

11. The localization system of claim 10, wherein the feature extracting unit extracts a circular image patch including line features and point features from the sub-sampled image data.

12. The localization system of claim 9, wherein the producing unit comprises:

- a matching confirming unit for confirming whether it is matched or not for feature pairs by using an IMU (Inertial Measurement Unit) and point features in the image patch; and
- a line extracting unit for extracting the line of subpixel for the image patch by 3D line distribution.

13. The localization system of claim 12, wherein the matching confirming unit searches point features of image patch (t) according to the movement of the camera [R/t] detected from the IMU in the basis of previous image patch (t−1), and acquires a plurality of feature pairs having the same straight line segment by matching each of the point features of the previous image patch (t−1) and the point features of the image patch (t).

14. The localization system of claim 13, wherein the line extracting unit expands 3D distribution for the image patch (t) by using the 3D line distribution of 3D Gaussian kernel, produces maximum line connecting maximum point in 3D distribution result, and extracts the accurate subpixel.

15. The localization system of claim 9, wherein the location estimating unit estimates the location of the camera by producing innovation term between the estimated line for the previous image patch (t−1) acquired by using an Inertial Navigation Sensor included in the mobile devices and the produced line for the image patch (t).

16. The localization system of claim 15, wherein the location estimating unit improves accuracy of the estimate of the location of the camera (state x) by considering gradient difference between line gradient (at) of the produced line in the image patch (t) and line gradient (at−1) of the estimated line in the previous image patch (t−1).

* * * * *